Aug. 5, 1969  R. W. METZGER, JR  3,459,355

ULTRASONIC WELDER FOR THIN WIRES

Filed Oct. 11, 1967

INVENTOR.
Robert W. Metzger, Jr.
BY
E. J. Biskup
ATTORNEY

United States Patent Office 3,459,355
Patented Aug. 5, 1969

3,459,355
ULTRASONIC WELDER FOR THIN WIRES
Robert W. Metzger, Jr., Kokomo, Ind., assignor to General Motors Corporation, Detroit, Mich., a corporation of Delaware
Filed Oct. 11, 1967, Ser. No. 674,465
Int. Cl. B23k 1/06
U.S. Cl. 228—1                4 Claims

ABSTRACT OF THE DISCLOSURE

A high frequency vibratory apparatus for welding thin wires to transistors and having a transducer coupled to an elongated tubular welding member through which the wire extends. The welding member is characterized by having a wedge-shaped groove formed in one end thereof for accommodating a portion of the wire and permitting the latter to be angularly positioned about the longitudinal axis of the welding member during a welding operation.

---

Practically all ultrasonic welding or bonding of lead wires on transistors is accomplished by using a tubular or capillary type welding tip. The lead wire to be welded is fed down through the welding member, the lower end of which has a groove which accommodates the wire before welding occurs. Ultrasonic wire welding on small transistors can be done not only on the semiconductor areas but also on the terminal post with relative ease. On the larger transistors, however, such as those utilized with power devices, the package bases are larger in size and it has been found that unless the base is repositioned it is very difficult to ultrasonically weld the lead wire to the terminal post after the wire has been welded to the semiconductor. Repositioning of the base is necessary in order to keep the wire in the groove of the present welding tip and attempts to weld without using the groove have been found to be very inefficient because less area of the tip encompasses the wire end, as a consequence, detuning occurs resulting in a poor weld. Another difficulty encountered in ultrasonic welding of the lead wires of large transistors is caused by the size of the wires used. For example, lead wires having a diameter equal to or greater than 8 mil require special attention in order to preclude excessive weld mash-out which could cause shorting between the elements of the transistor.

Accordingly, the principal objects of this invention are to provide a vibratory welder which permits ultrasonic welding of large diameter lead wires to a plurality of areas of a transistor within a given range relative to the first weld without severing the wire or requiring repositioning of the transistor base package; to provide an ultrasonic welding tip of the tubular or capillary type having the lower end thereof formed with an open wedge having a depth related to the size of the lead wire and incorporating a positive stop so as to minimize mash-out; and to provide an ultrasonic welding tip having a recessed flat wire contact surface formed in the lower end of the welding tip and bordered by a positive stop which prevents excessive wire mash-out.

Other objects and advantages of the present invention will be more apparent from the following detailed description when taken with the drawings in which.

Figure 1:
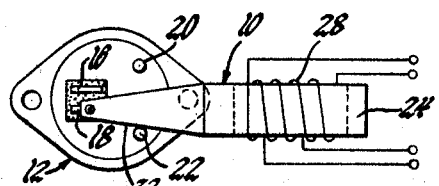
FIGURE 1 is a plan view showing a transistor package base associated with an ultrasonic welding apparatus made in accordance with the invention and shown in schematic form.
Figure 2:
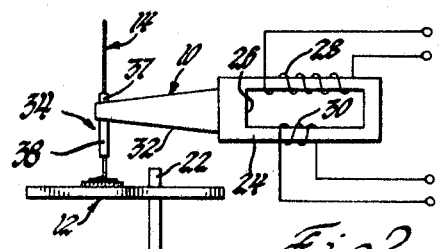
FIGURE 2 is an elevation view of the arrangement shown in FIGURE 1.

Referring to the drawings and more particularly FIGURES 1 and 2 thereof, an ultrasonic welding apparatus 10 is shown located adjacent to a transistor base package 12 with both parts being relatively positioned preparatory to accomplishing welding of a lead wire 14 to the transistor semiconductor parts 16 and 18 and a pair of spaced terminal posts 20 and 22. The welding apparatus 10 includes a transducer comprising a laminated core 24 of nickel or other magnetostrictive metallic material having a rectangularly-shaped opening 26 in its center portion. Wound through the opening 26 about opposed arms of the core 24 is a polarizing coil 28 charged with D.C. current and an excitation coil 30. As is conventional in transducers of this type, upon variations of the magnetic field strength of the excitation coil 30, variations in length of the core 24 occur so as to produce expansion and contraction of the transducer at a frequency equal to the alternating electric current flowing in the excitation coil 30. A horn or coupling member 32 is attached to the transducer and serves to transmit the vibrations thereof to a welding member 34 rigidily supported by the coupling member along an axis substantially normal to the longitudinal axis of the transducer. As is conventional with welding apparatus of this type, the welding member 34 is tuned to the vibration output of the transducer and experiences flexural type movement.

Figure 3:
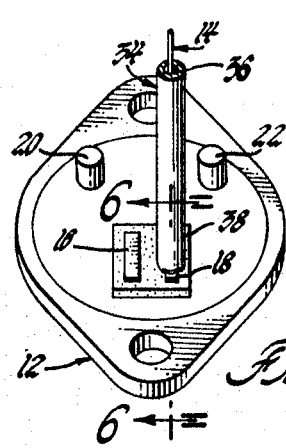
FIGURES 3, 4 and 5 show the sequence of steps involved in welding a lead wire to a transistor base package utilizing the ultrasonic welding apparatus of FIGURES 1 and 2.
Figure 6:
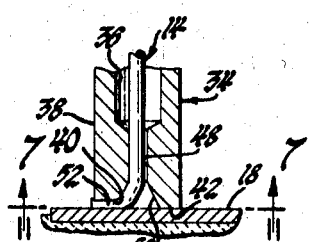
FIGURE 6 is an enlarged sectional view taken on line 6—6 of FIGURE 3.

As best seen in FIGURES 2, 3 and 6, the welding member 34 is formed as a tubular reed having a longitudinally extending passageway 36 that serves to accommodate the wire 14 that is fed through the upper end 37 of the passageway 36 and exits at the lower end 38 thereof. The lead wire 14 serves as a conductor that is fed continuously into and through the welding member 34 in order to avoid the difficulty of dealing with individual lengths of lead. The wire 14 is adapted to be welded to one of the semiconductor parts of the transistor base package 12 and one of the terminal posts during the manufacture of the transistor.

Figure 7:
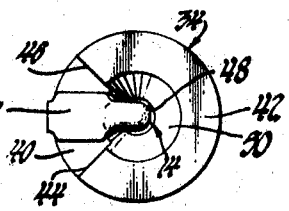
FIGURE 7 is a view taken on line 7—7 of FIGURE 6 and shows the construction of the welding tip.

The lower end 38 of the welding member 34 serves as the welding tip and is located at an antinodal point so that it experiences maximum deflection during the operation of the transducer. More specifically, it will be noted that the lower end or welding tip 38 is formed with a wedge-shaped notch that accommodates a portion of the lead wire and is defined by a planar surface 40 lying in a plane that is substantially perpendicular to the longitudinal axis of the welding member 34. The surface 40 is parallel to and spaced a predetermined distance from the surface 42 which serves as a stop surface to be more fully described hereinafter. The notch is further defined by surfaces 44 and 46 which lie in planes that are substantially parallel to the longitudinal axis of the welding member 34 and, as seen in FIGURE 7, intersect at the imaginary center of the latter. As seen in FIGURE 6, the passageway 36 communicates with a guide passage 48 that leads to a frusto-conical opening 50, the latter of which is adjacent to the surface 42. The guide passage 48 is somewhat reduced in cross section and has a diameter which is slightly larger than the diameter of the lead wire 14. Thus, as the lead wire 14 protrudes out of the welding tip 38, it can be accommodated by the notch formed therein so as to cause a portion 52 of the wire 14 to be best bent without breaking and lie in a plane substantially normal to the portion of the wire within the welding member 34.

During a welding operation, the transistor base package 12 is located in a fixed position as shown in FIGURE 3. The portion 52 of the lead wire 14 is bent angularly, as shown in FIGURE 6, and the welding member 34 is lowered into contact with the semiconductor portion 18 after which the transducer is energized causing reciprocal movement of the welding tip 38 at an ultra-high frequency so as to weld the portion 52 to the base package. As is well known, the vibratory welding frequency utilized in a welding process of this type may be varied within a very broad range and, in most cases, lies between about 10,000 and 100,000 cycles per second. Also, a predetermined clamping force is used at this time in order to press the portion 52 of the lead wire into contact with the opposing part and the force utilized also varies within a given range. The operating frequency, clamping force, and also time cycle during which the welding occurs are all well known to those skilled in the art; accordingly, they need not be discussed in detail here.

Figure 4:
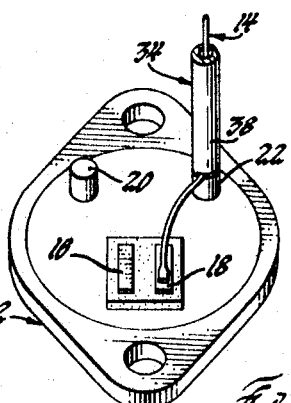

After welding the portion 52 of the lead wire to the semiconductor portion 18, the welding member 34 is then moved angularly toward the terminal post 22. Inasmuch as the notch in the welding tip 38 has a wedge-shape, sufficient clearance is provided for allowing rotation of the lower end of the lead wire about the longitudinal axis of the welding member 34 without losing contact with the surface 40 of the welding tip. Accordingly, the transistor package 12 need not be repositioned but can maintain its original position so that the lead wire 14 then can be welded to the terminal post 22 as shown in FIGURE 4. This is a particularly important feature of the invention since by proper angular disposition of the surfaces 44 and 46 relative to each other, the welding member 34 can be relocated to a multitude of areas on the transistor package 12 for welding the lead wire 14. As shown in FIGURE 7, the angle formed by planes passing through surfaces 44 and 46 is approximately 90°, but it will be understood that this can vary depending on the location of the terminal posts 20 and 22 relative to the semiconductor portions 16 and 18. Also, as should be apparent, the surfaces 44 and 46 serve as guide stops for quickly and properly locating the wire for bonding to the contact terminals.

Figure 5:
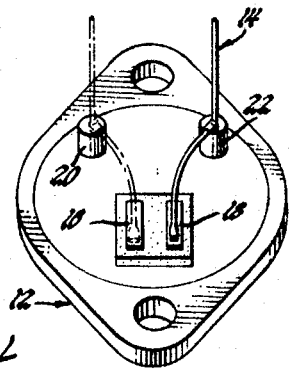

Once the lead wire 14 is welded to the terminal post 22, the welding member 34 is then raised and the lead wire 14 is cut so as to permit the latter to be in the center of the surface 40 preparatory to making the next weld on the semiconductor portion 16 followed by a weld on the terminal post 20 to complete the welding sequence. These subsequent steps of the welding operation provide the wire welds as illustrated in phantom lines in FIGURE 5.

It will be noted that one feature of the welding tip provided by the present invention is that the terminal surface 42 of the welding tip 38 serves as a stop so as to prevent excessive mash-out of the wire material when completing a weld. In this connection, attention is particularly directed to FIGURES 6 and 7, the former of which shows the surface 42 contacting the semiconductor part 18 and serving as a positive stop so that the cross sectional thickness of the wire in the weld zone cannot be reduced beyond a predetermined dimension. In order to realize optimum minimum mash-out, it has been found that the depth of the notch should be approximately one-half the diameter of the wire used. For example, when welding wire having a diamter of .010 inches, the depth of the notch should be approximately .005 inches.

Figure 8:
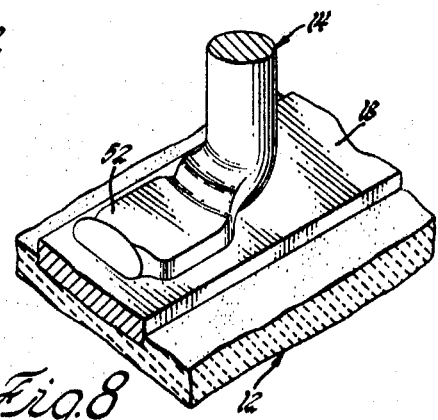
FIGURE 8 is a perspective view showing a completed weld between the one end of a lead wire and a semiconductor portion of the transistor.
Figure 9:
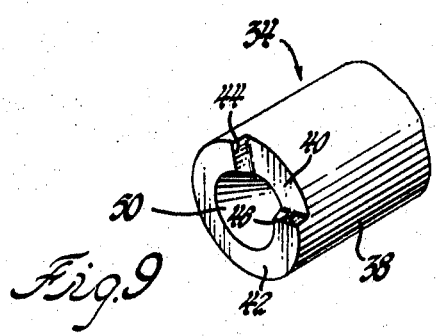
FIGURE 9 is an isometric view of the welding tip shown in FIGURES 6 and 7.

Another feature of the welding tip described above is that it permits the entire area of surface 40 to act as the welding area. This welding area is flat so that the completed weld takes the form illustrated in FIGURE 8 and precludes the possibility of the welding tip digging into the material of the wire and causing mash-out because of localization of vibratory energy. Another advantage of the flat welding area provided by the surface 40 is that it gives a much larger welding surface than heretofore provided by similar welding apparatus. Hence, the wire 14 has much more contact with a localized portion of the transistor and therefore, the weld resulting therefrom provides a mechanically stronger connection that has a low electrical resistance.

Various changes and modifications can be made in this construction without departing from the spirit of the invention. Such changes and modifications are contemplated by the inventor and he does not wish to be limited except by the scope of the appended claims.

I claim:

1. An apparatus for ultrasonically welding a lead wire to a transistor base having a semiconductor part and at least one contact part angularly spaced therefrom comprising, an elongated member having a longitudinal bore through which said lead wire extends, a wedge-shaped notch defined by at least three surfaces formed in one end of said member, one of said surfaces being located in a plane substantially normal to the longitudinal axis of said bore, said notch accommodating a portion of the wire and permitting said portion of said wire to be rotated between the other of said surfaces about said longitudinal axis and be welded to said semiconductor part and said contact part without repositioning said transistor base.

2. An apparatus for ultrasonically welding a metal wire to a transistor base portion having a semiconductor part and at least one contact part angularly spaced therefrom comprising, a high frequency vibration generator, an elongated tubular member adapted to be coupled to said generator in vibration transmitting relationship, one end of said tubular member having a notch formed therein defined by first, second and third surfaces, the first surface lying in a plane substantially normal to the longitudinal axis of the tubular member, the second and third surfaces lying in intersecting planes that are substantially parallel to said longitudinal axis, said metal wire extending through the tubular member and having a portion engageable with said first surface and adapted to be moved between said second and said third surfaces so as to allow welding of said portion of the metal wire to said semiconductor part and said contact part without requiring repositioning of the transistor base portion.

3. An apparatus for ultrasonically welding a metal wire to a transistor base portion having a semiconductor part and at least one contact part angularly spaced therefrom comprising, a high frequency vibration generator, an elongated tubular member adapted to be coupled to said generator in vibration transmitting relationship, one end of said tubular member having a wedge-shaped notch formed therein defined by first, second and third surfaces, the first surface lying in a plane substantially normal to the longitudinal axis of the tubular member, the second and third surfaces lying in planes that intersect at and are substantially parallel to said longitudinal axis, said metal wire extending through the tubular member and having a portion engageable with said first surface and adapted to be angularly moved between said second and said third surfaces so as to allow welding of the first portion of the metal wire to said semiconductor part and said contact part without requiring repositioning of the transistor base portion.

4. An apparatus for ultrasonically welding a metal wire to a transistor base portion having a semiconductor part and at least one contact part angularly spaced therefrom comprising, a high frequency vibration generator, an elongated tubular member adapted to be coupled to said generator in vibration transmitting relationship, one end of said tubular member having a notch formed therein defined by first, second and third surfaces, said notch having a depth approximately one-half the diameter of said wire, the first surface lying in a plane substantially normal to the longitudinal axis of the tubular member, the second and third surfaces lying in intersecting planes that are substantially parallel to said longitudinal axis, said metal wire extending through the tubular member and having a portion engageable with said first surface and adapted to be moved between said second and said third surfaces so as to allow welding of said portion of the metal wire to said semiconductor part and said contact part without requiring repositioning of the transistor base portion.

References Cited

UNITED STATES PATENTS

| | | | |
|---|---|---|---|
| 3,400,448 | 9/1968 | Helda | 228—3 |
| 3,397,451 | 8/1968 | Avedissian | 228—3 |
| 3,347,442 | 10/1967 | Reber | 228—3 |
| 3,313,464 | 4/1967 | Avedissian | 228—3 |
| 3,289,452 | 12/1966 | Kollner | 228—3 |
| 3,216,640 | 11/1965 | Szasz | 228—3 |
| 3,128,649 | 4/1964 | Avila | 228—1 |
| 3,087,239 | 4/1963 | Clagett | 228—1 |

RICHARD H. EANES, JR., Primary Examiner